US008693827B2

(12) United States Patent
Katayama et al.

(10) Patent No.: US 8,693,827 B2
(45) Date of Patent: Apr. 8, 2014

(54) THREE-WAVELENGTH OPTICAL MULTIPLEXER

(75) Inventors: Takatomo Katayama, Higashiosaka (JP); Tomoyuki Kubota, Higashiosaka (JP)

(73) Assignee: Tatsuta Electric Wire & Cable Co., Ltd., Higashiosaka-shi (JP)

( * ) Notice: Subject to any disclaimer, the term of this patent is extended or adjusted under 35 U.S.C. 154(b) by 151 days.

(21) Appl. No.: 13/386,734

(22) PCT Filed: Jul. 16, 2010

(86) PCT No.: PCT/JP2010/062038
§ 371 (c)(1),
(2), (4) Date: Jan. 24, 2012

(87) PCT Pub. No.: WO2011/010607
PCT Pub. Date: Jan. 27, 2011

(65) Prior Publication Data
US 2012/0128296 A1 May 24, 2012

(30) Foreign Application Priority Data

Jul. 24, 2009 (JP) ................................. 2009-173313

(51) Int. Cl.
*G02B 6/26* (2006.01)
*G02B 6/42* (2006.01)
(52) U.S. Cl.
USPC .................. 385/43; 385/20; 385/21; 385/30; 385/39; 385/44
(58) Field of Classification Search
USPC ............ 385/20, 21, 30, 42–44, 106, 114–121
See application file for complete search history.

(56) References Cited

U.S. PATENT DOCUMENTS

| 5,170,451 A | * | 12/1992 | Ohshima ........................ 385/43 |
| 5,666,447 A | * | 9/1997 | Chuang et al. .................. 385/31 |
| 5,946,141 A | * | 8/1999 | Harrigan ...................... 359/642 |
| 6,134,362 A | * | 10/2000 | Au-Yeung et al. .............. 385/43 |

(Continued)

FOREIGN PATENT DOCUMENTS

| JP | 62 017709 | 1/1987 |
| JP | 05 313038 | 11/1993 |

(Continued)

OTHER PUBLICATIONS

International Search Report issued on Aug. 10, 2010 in PCT/JP10/062038 filed on Jul. 16, 2010.

(Continued)

*Primary Examiner* — Rhonda Peace
(74) *Attorney, Agent, or Firm* — Oblon, Spivak, McClelland, Maier & Neustadt, L.L.P.

(57) ABSTRACT

Disclosed is a three-wavelength optical multiplexer which is compact, and which multiplexes light having different wavelength incident to three single-mode optical fibers, particularly light of red, green, and blue at transmittance above a certain reference. Specifically disclosed is a three-wavelength optical multiplexer (100) which comprises three single mode optical fibers (1, 2, 3), wherein the three single-mode optical fibers (1, 2, 3) having incidence/emission ports are arranged in parallel to one another in this order as observed from the cross sectional direction orthogonal to the fiber axis direction, and are fused and drawn, and wherein the relationship of a secondary-mode cutoff wavelength (C1) which is one of the parameters of the single mode optical fiber (1) and the single-mode cutoff wavelength (2), a secondary-mode cutoff wavelength (C2) which is one of the parameters of the single-mode optical fiber (3), and the wavelength (λ3) of light incident from the single-mode optical fiber (3) is sin C1<C2<λ3.

5 Claims, 10 Drawing Sheets

(56) References Cited

U.S. PATENT DOCUMENTS

| | | | |
|---|---|---|---|
| 6,397,636 B1* | 6/2002 | DiGiovanni et al. | 65/395 |
| 6,859,586 B2* | 2/2005 | Epworth et al. | 385/42 |
| 2002/0054740 A1* | 5/2002 | Vakili et al. | 385/115 |
| 2012/0128296 A1* | 5/2012 | Katayama et al. | 385/24 |

FOREIGN PATENT DOCUMENTS

| | | | |
|---|---|---|---|
| JP | 06 214136 | | 8/1994 |
| JP | 08 146244 | | 6/1996 |
| JP | 08 220370 | | 8/1996 |
| JP | 2008 261942 | | 10/2008 |
| JP | 2011027985 A | * | 2/2011 |

OTHER PUBLICATIONS

International Preliminary Report on Patentability Issued Feb. 7, 2012 in PCT/JP10/62038 filed Jul. 16, 2010 (with English translation).

* cited by examiner

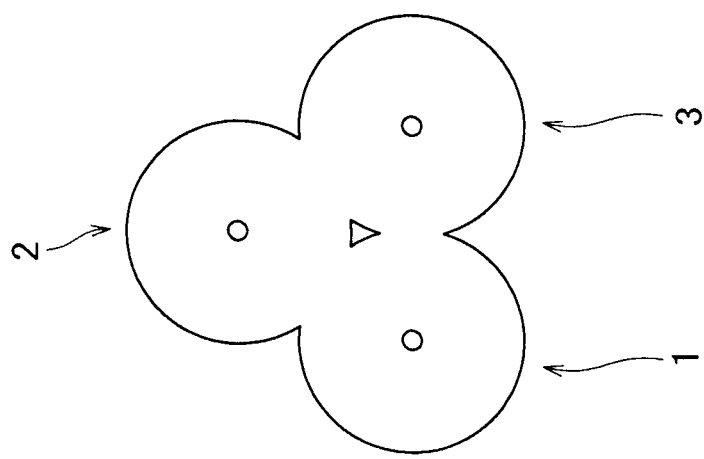
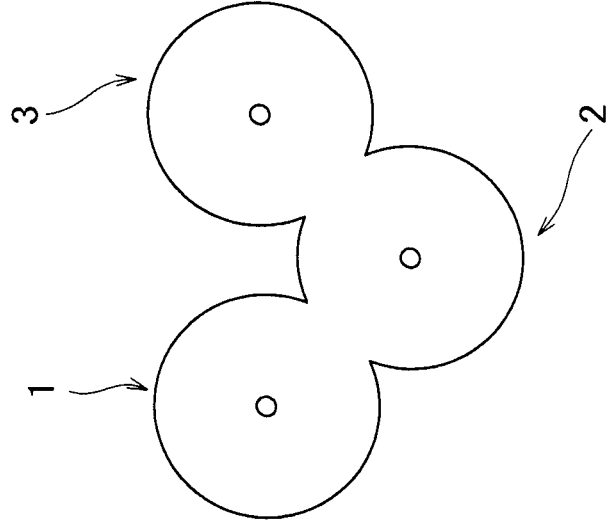
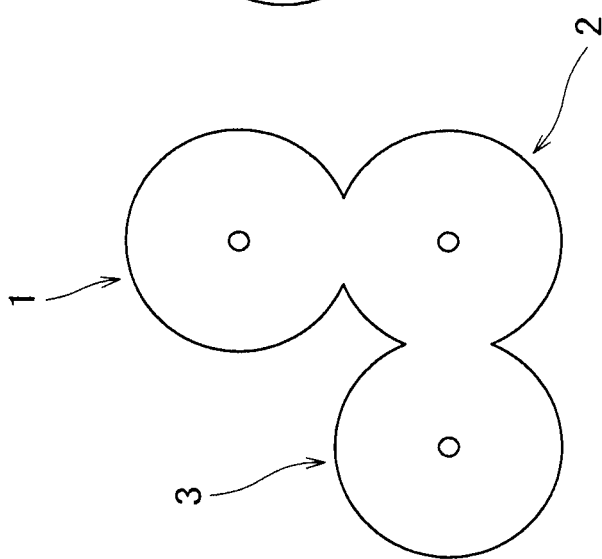

FIG.4

CHARACTERISTICS OF SINGLE-MODE OPTICAL FIBER

| ITEM | SINGLE-MODE OPTICAL FIBER A | SINGLE-MODE OPTICAL FIBER B |
|---|---|---|
| OPERATION WAVELENGTH | 445~600nm | 600~770nm |
| MOLD FIELD DIAMETER (MFD) | 3.5±0.5 μm@515nm | 4.0±0.5 μm@630nm |
| SECONDARY-MODE CUTOFF WAVELENGTH | 430±15nm | 570±30nm |
| NUMBER OF APERTURES | 0.13 | 0.13 |
| CLAD DIAMETER | 125.0±1.5 μm | 125.0±1.5 μm |
| COATING DIAMETER | 245±15 μm | 245±15 μm |

FIG.7

CONFIGURATION TABLE OF COMPARATIVE EXAMPLE 1, 2, AND EXAMPLE

| | SINGLE-MODE OPTICAL FIBER | FIBER ADOPTED | INCIDENT LIGHT | WAVELENGTH | SECONDARY-MODE CUTOFF WAVELENGTH |
|---|---|---|---|---|---|
| COMPARATIVE EXAMPLE ONE | 1 | SINGLE-MODE OPTICAL FIBER A | BLUE(B) | 446nm(λ1) | 434nm(C1) |
| | 2 | SINGLE-MODE OPTICAL FIBER A | GREEN(G) | 532nm(λ2) | |
| | 3 | SINGLE-MODE OPTICAL FIBER A | RED(R) | 635nm(λ3) | |
| COMPARATIVE EXAMPLE TWO | 1 | SINGLE-MODE OPTICAL FIBER A | BLUE(B) | 446nm(λ1) | 434nm(C1) |
| | 2 | SINGLE-MODE OPTICAL FIBER B | RED(R) | 635nm(λ3) | 574nm(C2) |
| | 3 | SINGLE-MODE OPTICAL FIBER A | GREEN(G) | 532nm(λ2) | 434nm(C3) |
| EXAMPLE | 1 | SINGLE-MODE OPTICAL FIBER A | BLUE(B) | 446nm(λ1) | 434nm(C1) |
| | 2 | SINGLE-MODE OPTICAL FIBER A | GREEN(G) | 532nm(λ2) | 434nm(C1) |
| | 3 | SINGLE-MODE OPTICAL FIBER B | RED(R) | 635nm(λ3) | 574nm(C2) |

THREE-WAVELENGTH OPTICAL MULTIPLEXER

TECHNICAL FIELD

The present invention relates to a three-wavelength optical multiplexer which multiplexes three wavelengths of light which are incident to three waveguides each for single-mode transmission, into one waveguide for single-mode transmission.

BACKGROUND ART

Traditionally, there have been an optical divider, an optical demultiplexer, and an optical multiplexer, in which three optical fibers serving as a waveguide are disposed on a single plane and fused and drawn so as to divide, demultiplex, or multiplex incident light.

For Example, Patent Document 1 discloses an optical fiber coupler in which two optical fibers whose propagation constants are substantially the same and a single dummy optical fiber are arranged, fused and drawn. This realizes an optical fiber coupler for equal division, having a broad band wavelength characteristic. Further, Patent Document 2 discloses an optical fiber coupler in which three optical fibers including an optical fiber whose normalized frequency and/or a fiber diameter is/are different from those of the other optical fibers, which are arranged, fused and drawn. This realizes an optical fiber coupler by which two optical signals of 1.3 μm and 1.55 μm incident to a single port on the input side are demultiplexed into optical signals of 1.3 μm and 1.55 μm at the output side, and the optical signal of 1.3 μm is equally divided.

Further, Patent Document 3 discloses a optical fiber optical multiplexer in which three optical fibers including an optical fiber whose core diameter is greater than those of the others, are arranged, fused and drawn. This realizes an optical fiber optical multiplexer capable of multiplexing optical signals of a single wavelength with a low loss.

PRIOR ART DOCUMENT

Patent Document

[Patent Document 1] Japanese Unexamined Patent Publication No. 313038/1993 (Tokukaihei 5-313038)
[Patent Document 2] Japanese Unexamined Patent Publication No. 220370/1996 (Tokukaihei 8-220370)
[Patent Document 3] Japanese Unexamined Patent Publication No. 214136/1994 (Tokukaihei 6-214136)

SUMMARY OF INVENTION

Technical Problem

These optical fiber couplers are however for use in optical communications, and the waveband of the optical signals to be transmitted is not less than 1 μm. Therefore, for example, these optical fiber couplers are not suitable for multiplexing visible light such as light of red, green, or blue, used in an image display, or the like.

To use an optical fiber coupler for an image display, or the like, light of three colors incident to the optical fiber coupler needs to be multiplexed at a transmittance not less than a certain reference. The optical fiber coupler disclosed in Patent Document 1 is intended to broaden the band of optical signals emitted. The optical fiber coupler disclosed in Patent Document 2 intended to demultiplexing and equal division of optical signals of two wavelengths incident. The optical fiber optical multiplexer disclosed in Patent Document 3 is intended to reduce the loss in the optical signals multiplexed by having optical signals of a single wavelengths be incident. Thus, these optical fiber couplers are not suitable for multiplexing light of three colors respectively having different wavelengths, at a transmittance of a certain reference or higher.

Further, as means for multiplexing three colors of light having different wavelengths, at a transmittance of a certain reference or higher, there have been known a multiple-staged optical fiber optical multiplexer in which two optical fiber optical multiplexers are serially connected, or a bulk optical multiplexer having an assembly for combining optical signals. However, in the multiple-staged optical fiber optical multiplexer, there is a need for managing to fit fibers in a package after connecting the two optical fiber optical multiplexers. This causes an increase in the size and the size of a device using this multiplexer inevitably becomes large. Further, the bulk optical multiplexer requires accurate positioning of an optical axis among the structuring parts. Vibration or the like may cause displacement of the optical axis, which leads to a poor reliability.

In view of the above, it is an object of the present invention to provide a compact three-wavelength optical multiplexer capable of multiplexing light having different wavelengths incident to three waveguides, particularly light of red, green, and blue, at a transmittance of a certain reference or higher.

Technical Solution

The present invention is three-wavelength optical multiplexer, including: three waveguides including a first waveguide capable of performing single-mode transmission, a second waveguide capable of performing single-mode transmission, and a third waveguide capable of performing single-mode transmission, which are arranged parallel to one another in this order, as observed from a cross sectional direction orthogonal to a fiber axis direction, wherein the first waveguide and the third waveguide are not in contact with each other, but are in contact with the second waveguide, of the three waveguides, the first waveguide has parameters which are the same as parameters of the second waveguide, and the third waveguide have parameters which are different from the parameters of the first waveguide and the parameters of the second waveguide, and where a relation among wavelengths of light injected into the three waveguides is $\lambda 1 < \lambda 2 < \lambda 3$, light injected into the first waveguide has the wavelength of $\lambda 1$, light injected into the second waveguide has the wavelength of $\lambda 2$, light injected into the third waveguide has the wavelength of $\lambda 3$, and multiplexed light of light having these wavelengths $\lambda 1$, $\lambda 2$, and $\lambda 3$ is emitted from the first waveguide.

With the above structure, the three wavelengths of light injected are multiplexed at a transmittance of a certain reference or higher. Further, since the three waveguides are integrally structured, the optical multiplexer is made compact.

The three-wavelength optical multiplexer of the present invention may be adapted so that the first waveguide, the second waveguide, and the third waveguide are arranged parallel to one another in this order, along a single plane.

In the structure, since the first waveguide, the second waveguide, and the third waveguide are arranged parallel to one another in this order on a single plane. This facilitates packaging and realizes a stable quality.

Further, the three-wavelength optical multiplexer of the present invention may be adapted so that the first waveguide, the second waveguide, and the third waveguide are single-mode optical fibers, and these three waveguides are collectively fused and drawn.

In the above structure, the first waveguide, the second waveguide, and the third waveguide are each a single-mode optical fiber, and these three waveguides are collectively fused and drawn. This facilitates manufacturing of a light combining portion with a stable quality.

Further, the three-wavelength optical multiplexer of the present invention may be adapted so that one of the parameters is a secondary-mode cutoff wavelength, and a secondary-mode cutoff wavelength C1 of the first single-mode optical fibers and the second single-mode optical fibers, a secondary-mode cutoff wavelength C2 of the third single-mode optical fiber, and a wavelength λ3 of light injected into the third single-mode optical fiber have a relation of C1<C2<λ3.

With the above structure, the three wavelengths of incident light are more suitably multiplexed at a transmittance of a certain reference or higher.

Further, the present invention may be adapted so that each of the second waveguide and the third waveguide has an emission port which is subjected to a reflectionless termination.

With the above structure, it is possible to realize a three-wavelength optical multiplexer with three inputs and one output, while eliminating waveguides which are substantially unnecessary.

Further, the present invention may be adapted so that the light having the wavelength of λ1, the light having the wavelength of λ2, and the light having the wavelength of λ3 are visible light of blue, green, and red, respectively.

The above structure enables multiplexing of visible light of blue, green, and red; i.e., three wavelengths of light.

Advantageous Effects of Invention

With the three-wavelength optical multiplexer of the present invention, three wavelengths of incident light are multiplexed at a transmittance of a certain reference or higher. Further, since the three waveguides are integrally structured, the optical multiplexer is made compact.

BRIEF DESCRIPTION OF DRAWINGS

FIG. 3(a) shows an exemplary arrangement of single-mode optical fibers structuring the three-wavelength optical multiplexer. FIG. 3(b) shows an exemplary arrangement of the single-mode optical fibers structuring the three-wavelength optical multiplexer. FIG. 3(c) shows an exemplary arrangement of the single-mode optical fibers structuring the three-wavelength optical multiplexer.

FIG. 4 shows a table showing the characteristics of the single-mode optical fibers structuring the three-wavelength optical multiplexer related to the embodiment of the present invention.

FIG. 7 shows a table of structures of the three-wavelength optical multiplexer of Comparative Examples 1 and 2, and Example.

EMBODIMENT

The following describes an embodiment of the present invention with reference to the drawings.

(Structure of Three-Wavelength Optical Multiplexer)

Figure 1:
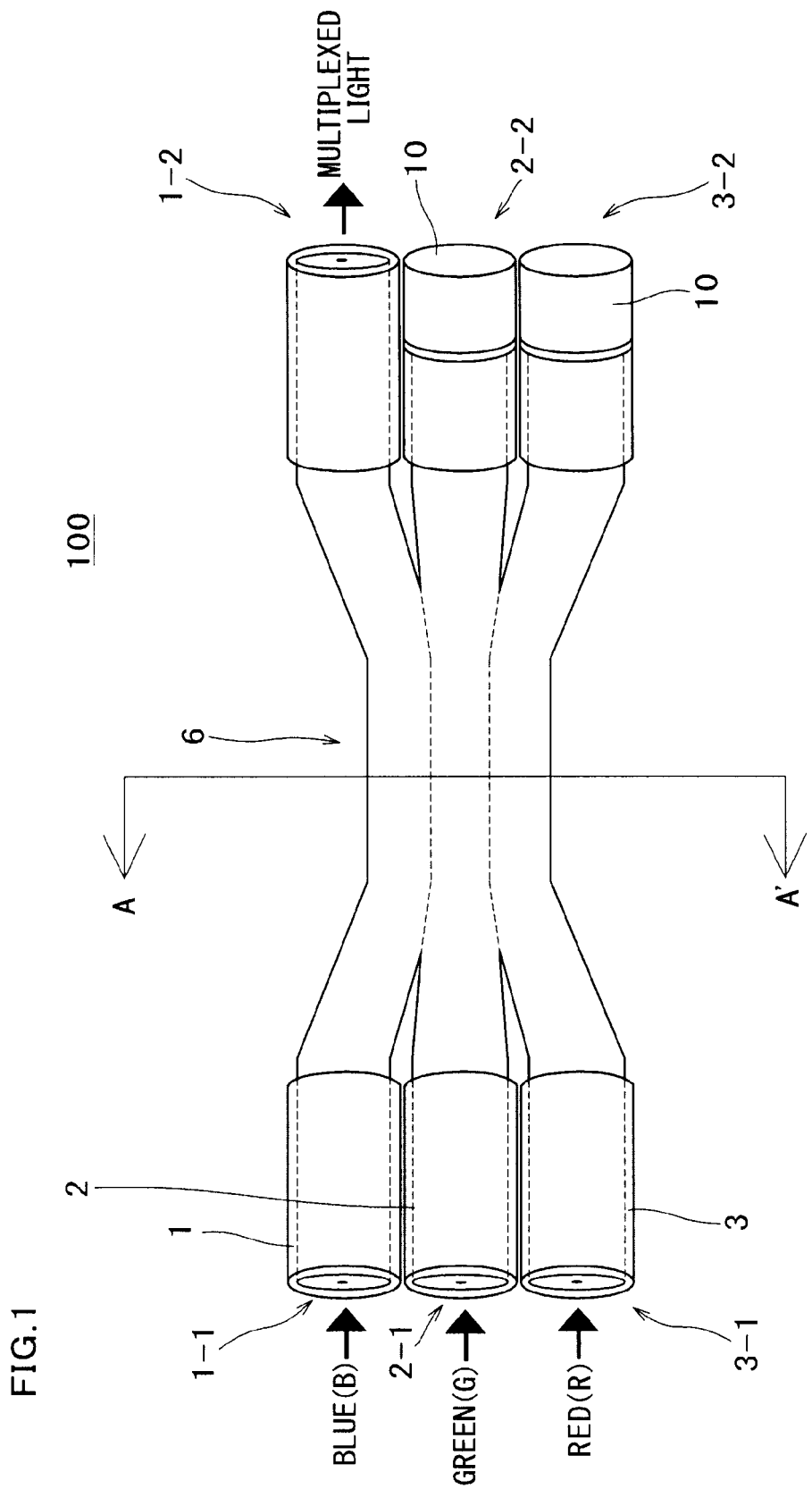
FIG. 1 shows a three-wavelength optical multiplexer related to an embodiment of the present invention.

FIG. 1 shows a three-wavelength optical multiplexer 100 related to an embodiment of the present invention. As shown in FIG. 1, the three-wavelength optical multiplexer 100 of the present embodiment has three single-mode optical fibers 1, 2, and 3.

The three single-mode optical fibers 1, 2, and 3 are arranged parallel to one another, and are collectively fused and drawn at a light combining portion 6. Note that the single-mode optical fibers 1, 2, and 3 are arranged parallel to one another at the light combining portion 6, as observed from a cross sectional direction which is orthogonal to a fiber axis direction. That is, the single-mode optical fibers 1, 2, and 3 may be arranged on a single plane at the light combining portion 6, or arranged along a single curved surface which is twisted in a spiral manner at the light combining portion 6. Further, the single-mode optical fiber 1 and the single-mode optical fiber 3 are not in contact with each other, but are in contact with the single-mode optical fiber 2.

Further, the single-mode optical fibers 1, 2, and 3 have ports to/from which light is incident and emitted. For Example, the single-mode optical fiber 1 has an incidence port 1-1 to which light is incident and an emission port 1-2 from which light is emitted. Similarly, the single-mode optical fiber 2 has an incidence port 2-1 and an emission port 2-2, and the single-mode optical fiber 3 has an incidence port 3-1 and an emission port 3-2. Note that each of the emission port 2-2 and the emission port 3-2 has an end portion 10 which is subjected to a reflectionless termination.

To the incidence ports 1-1, 2-1, 3-1 of the single-mode optical fibers 1, 2, and 3 are incident different wavelengths of light, respectively. Specifically, to the incidence port 3-1 of the single-mode optical fiber 3 at the lower side of FIG. 1 is incident light of red. To the incidence port 2-1 of the single-mode optical fiber 2 in the middle of FIG. 1 is incident light of green. Further, to the incidence port 1-1 of the single-mode optical fiber 1 on the upper side of FIG. 1 is incident light of blue. The visible light of three colors are multiplexed in the light combining portion 6, and multiplexed light is emitted from the emission port 1-2. Note that, the emission ports 2-2 and 3-2 has the end portion 10 which is subjected to a reflectionless termination. This way reflection of optical signals towards the incidence ports is prevented.

In the present embodiment, the light of red means light having a wavelength within a range of 600 nm-700 nm. The light of green means light having a wavelength within a range of 490 nm-600 nm. Further, light of blue means light having a wavelength within a range of 400 nm-500 nm. Note that the above mentioned wavebands are adopted in the present embodiment, although there would be various interpretation in relation to the above mentioned values of the wavebands, depending on the purpose or the like; e.g., the light of green and the light of blue partially share the waveband.

Figure 2:
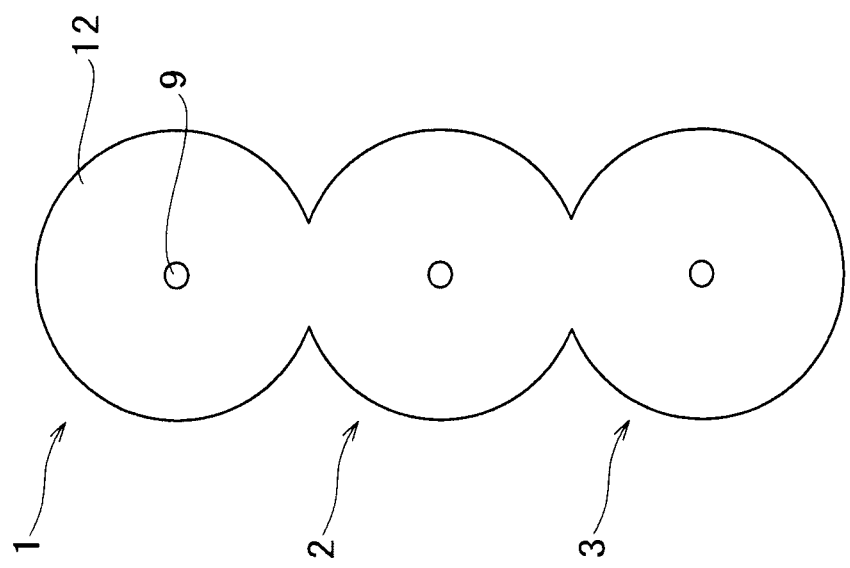
FIG. 2 is a cross sectional view of a light combining portion in the three-wavelength optical multiplexer shown in FIG. 1.

Next, FIG. 2 is a cross sectional view of the light combining portion 6 of the three-wavelength optical multiplexer 100, which is taken along a line A-A' shown in FIG. 1. As shown in FIG. 2, each of the single-mode optical fibers 1, 2, and 3 structuring the three-wavelength optical multiplexer 100 has a core 9 and clad 12 formed around the core 9.

FIG. 3 shows an exemplary arrangement of the single-mode optical fibers 1, 2, and 3 in the three-wavelength optical multiplexer 100. As shown in FIGS. 3(a) and (b), the single-mode optical fiber 1 and the single-mode optical fiber 3 are arranged so as not to contact each other, but contact only the single-mode optical fiber 2. On the other hand, the three single-mode optical fibers 1, 2, and 3 are not arranged in a trefoil formation in which each of the single-mode optical fibers contact with the other two single-mode optical fibers as shown in FIG. 3(c).

(Characteristic of Single-Mode Optical Fibers)

The single-mode optical fibers 1, 2, and 3 having the above mentioned structure have characteristics shown in a table of FIG. 4. In the present embodiment, parameters of the single-mode optical fiber 1 and those of the single-mode optical fiber 2 are the same, and parameters of the single-mode optical fiber 3 are different from those of the two other single-mode optical fibers 1 and 2. Note that the parameters are parameters of the single-mode optical fibers 1, 2, and 3, and specifically includes: clad diameter, refraction index of the core, refraction index of the clad, the specific refractive indexes of the core and the clad, the number of apertures (NA), a secondary-mode cutoff wavelength, or the like.

In other words, in the present embodiment, the single-mode optical fibers having the same parameters are adopted as the single-mode optical fibers 1 and 2, and the single-mode optical fiber having different parameters are adopted as the single-mode optical fiber 3. Specifically, as the single-mode optical fibers 1 and 2, the single-mode optical fiber A shown in FIG. 4 is adopted. For the single-mode optical fiber 3 is adopted a single-mode optical fiber B shown in FIG. 4.

As shown in FIG. 4, the single-mode optical fiber A and the single-mode optical fiber B are significantly different in the wavelength. Specifically, the operating wavelength of the single-mode optical fiber A is 445-600 nm, and the secondary-mode cutoff wavelength is 430±15 nm. On the other hand, the operating wavelength of the single-mode optical fiber B is 600-770 nm, and the secondary-mode cutoff wavelength is 570±30 nm. The waveband is on the higher side as compared with that of the single-mode optical fiber A.

Figure 5:
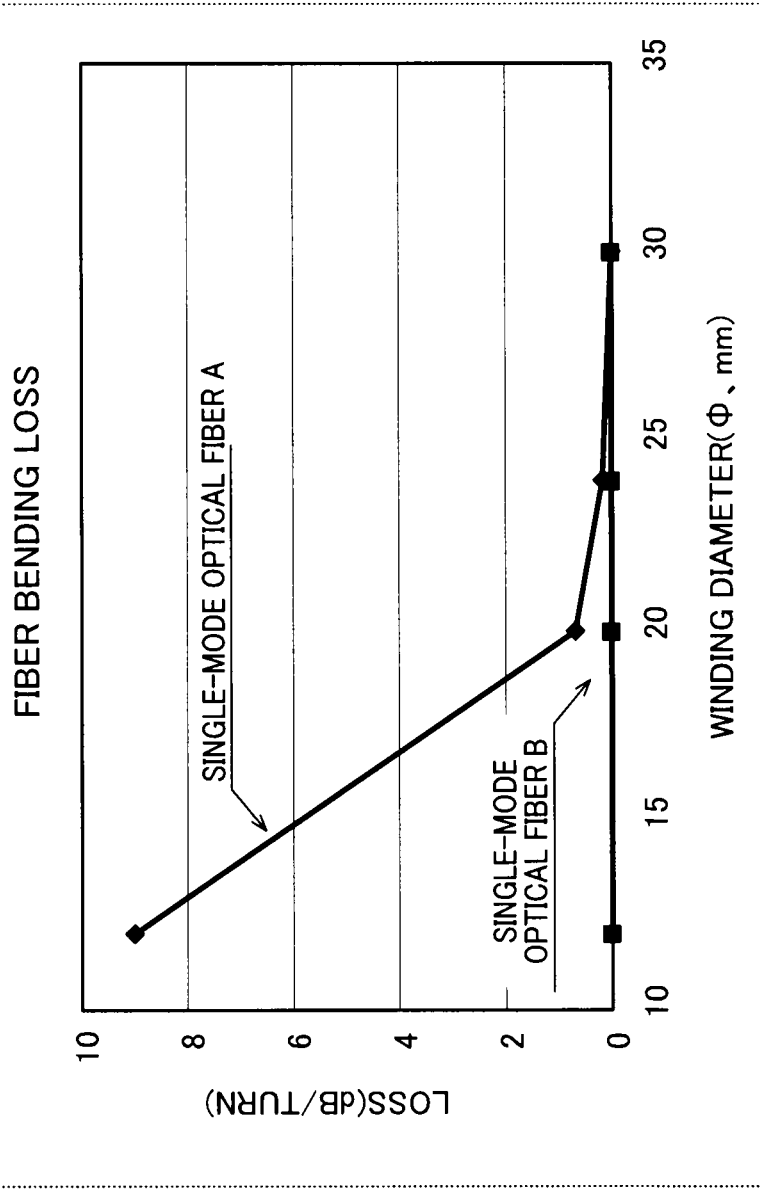
FIG. 5 shows a graph of winding diameter versus bending loss, when light of red is injected to the single-mode optical fiber structuring the three-wavelength optical multiplexer.

Further, the single-mode optical fiber A and the single-mode optical fiber B having the above characteristics are different from each other also in their bending losses. FIG. 5 is a graph of winding diameter vs. bending loss where light of red of 656 nm in wavelength is injected into the single-mode optical fiber A and the single-mode optical fiber B structuring the three-wavelength optical multiplexer 100.

As shown in FIG. 5, the winding diameter is varied while the light of red of 656 nm in its wavelength is injected into the single-mode optical fiber A and the single-mode optical fiber B. In the single-mode optical fiber A, a bending loss of approximately 1 dB occurs at 20 mm in diameter, and a bending loss of 9 dB at 12 mm in diameter. On the other hand, in the single-mode optical fiber B, no bending loss occurs even at 12 mm in diameter. Thus, it is possible to manage to fit the fibers in a smaller space by adopting the single-mode optical fiber B for the single-mode optical fibers to which light of red is to be incident, in the optical multiplexer. Therefore accommodation of the single-mode optical fibers in a smaller space is possible.

(Manufacturing of Three-Wavelength Optical Multiplexer)

Figure 6:
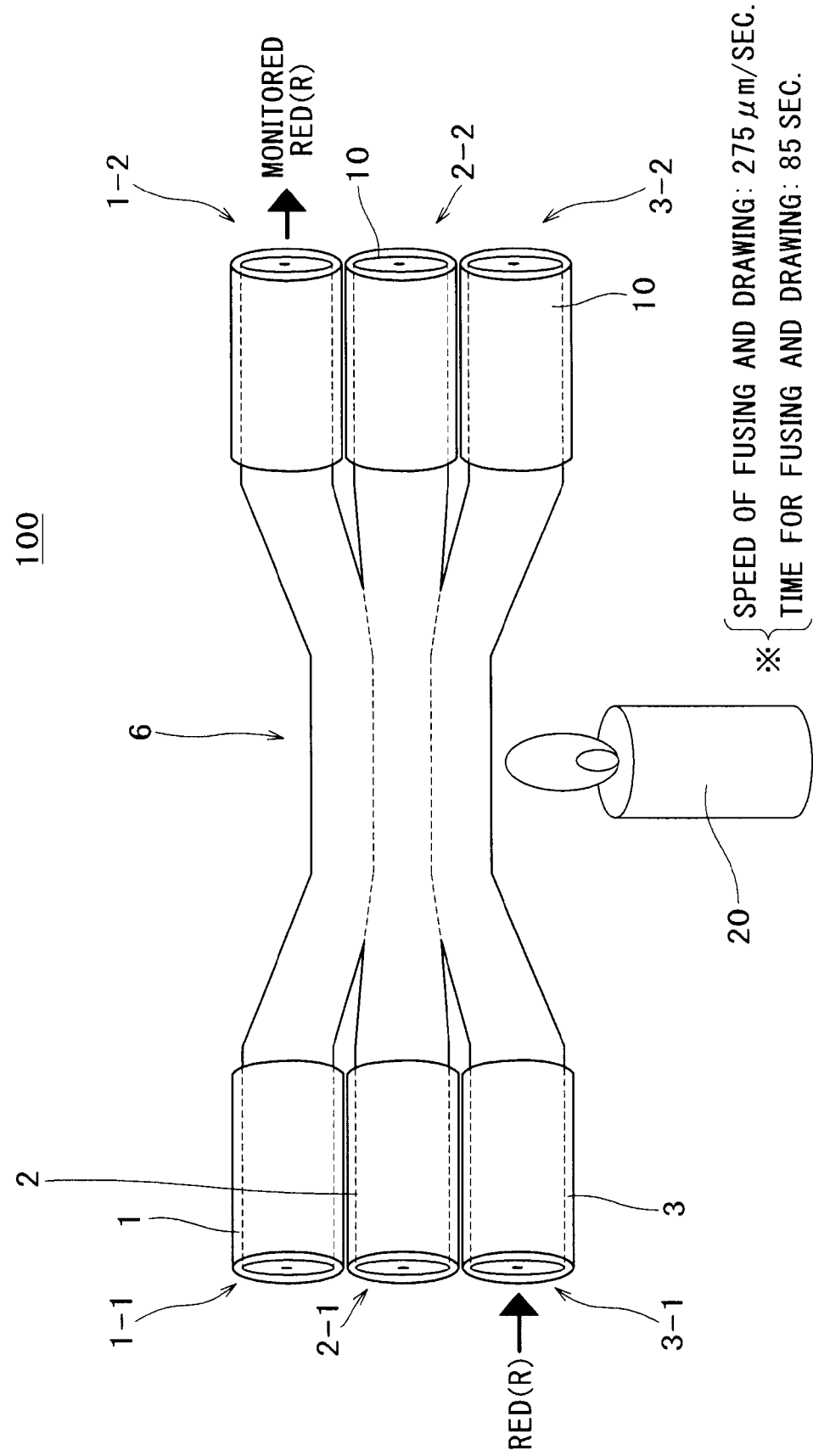
FIG. 6 shows a process of fusing and drawing in manufacturing of the three-wavelength optical multiplexer related to the embodiment of the present invention.

Next, the following describes a method of fusing and drawing adopted in formation of the light combining portion 6 in the three-wavelength optical multiplexer 100, with reference to FIG. 6. First, three single-mode optical fibers 1, 2, and 3 each having a portion for combining light are prepared. Next, only for the portion where the light combining portion 6 is to be formed, a protection material coating the clad 12 is removed. Then, the portions of the three single-mode optical fibers 1, 2, and 3 for combining light are arranged parallel to one another. During this state, the portions for combining light are drawn through a method described hereinbelow, while being heated and molten by a heat generating unit 20. Thus, the light combining portion 6 of the three-wavelength optical multiplexer 100 shown in FIG. 1 is formed.

Next, a method of drawing is described. The three single-mode optical fibers 1, 2, and 3 are abutted to one another as described above. Then, light of red is injected into the incidence port 3-1 of the single-mode optical fiber 3, and the single-mode optical fibers are drawn while emission power of light from the emission port 1-2 of the single-mode optical fiber 1 is monitored. Drawing is stopped, when the emission power of light from the emission port 1-2 reaches a desirable value. Thus, the light combining portion 6 of the three-wavelength optical multiplexer 100 is obtained.

The speed of fusing and drawing is 275 μm/second, and the period taken for drawing is approximately 85 seconds. In other words, the length of the light combining portion 6 after the drawing is approximately 23.375 mm. Note that the wavelength of the visible light incident to the incidence ports 1-1, 2-1, and 3-1 and the value of emission power at the time of stopping the drawing are suitably set according to transmittance targeted and the wavelength.

Note that in the above mentioned method of fusing and drawing, the light of red is injected into the single-mode optical fiber 3. This is because, the light of red has the longest wavelength among the visible light of three colors, and the binding curve thereof is very steep. Therefore, stopping the drawing when the emission power of the light of red reaches a desirable value is advantageous in that the light combining portion 6 of the three-wavelength optical multiplexer 100 with the minimum optical variations is formed. Note further that in the fusing and drawing, the light to be monitored is not limited to light of red, and light of green, or light of blue may be injected and monitored.

Comparative Examples 1 and 2, and Example

Next, the following describes an Example and Comparative Examples 1 and 2 of the three-wavelength optical multiplexer 100, and the characteristics thereof.

FIG. 7 is a configuration table of the three-wavelength optical multiplexers of Example and the Comparative Example 1 and 2. As shown in FIG. 7, the Comparative Example 1 adopts as the three single-mode optical fibers 1, 2, and 3 structuring the three-wavelength optical multiplexer 100, optical fibers which are at all the same in their parameters. Specifically, the single-mode optical fiber A shown in FIG. 4 is adopted as all of the three single-mode optical fibers 1, 2, and 3. In the three-wavelength optical multiplexer 100 of the Comparative Example 1, light of blue is injected into the single-mode optical fiber 1, the light of green is injected into to the single-mode optical fiber 2, and light of red is injected into to the single-mode optical fiber 3.

The Comparative Example 2 deal with a case where the three single-mode optical fibers 1, 2, and 3 structuring the three-wavelength optical multiplexer 100 include an optical fiber whose parameters are different. Specifically, in the Comparative Example 2, the single-mode optical fiber A shown in FIG. 4 is adopted for the single-mode optical fibers 1 and 3, and a single-mode optical fiber B shown in FIG. 4 is adopted for the single-mode optical fiber 2.

Further, in the Comparative Example 2, light injected into the three-wavelength optical multiplexer 100 is partially different from light injected into the three-wavelength optical multiplexer 100 of the Comparative Example 1 and Example. Specifically, light of blue is injected into the single-mode optical fiber 1, light of red is injected into the single-mode optical fiber 2, and light of green is injected into the single-mode optical fiber 3.

In Example, the single-mode optical fiber A shown in FIG. 4 is adopted for the single-mode optical fibers 1 and 2, and the single-mode optical fiber B shown in FIG. 4 is adopted for the single-mode optical fiber 3. Further, in the three-wavelength optical multiplexer 100 of Example, light of blue is injected into the single-mode optical fiber 1, light of green is injected into the single-mode optical fiber 2, and light of red is injected into the single-mode optical fiber 3.

The wavelength of light of blue incident to the three-wavelength optical multiplexer 100 is 446 nm, and this wavelength is referred to as $\lambda 1$. The wavelength of light of green is 532 nm, and this wavelength is referred to as $\lambda 2$. The waveband of the light of red is 635 nm, and this wavelength is referred to as $\lambda 3$. The secondary-mode cutoff wavelength of the single-mode optical fiber A is 434 nm, and this wavelength is referred as C1. Further, the secondary-mode cutoff wavelength of the single-mode optical fiber B is 574 nm, and this wavelengths is referred to as C2.

In the three-wavelength optical multiplexer 100 of Example, the parameters of the single-mode optical fiber 1 are the same as the parameters of the single-mode optical fiber 2, and the parameters of the single-mode optical fiber 3 are different from the other two. Where the relation among the wavelengths of light injected into the three single-mode optical fibers 1, 2, and 3 (i.e., light of blue, light of green, and light of red) is $\lambda 1 < \lambda 2 < \lambda 3$, light of blue having the wavelength of $\lambda 1$ is injected into the single-mode optical fiber 1, light of green having the wavelength of $\lambda 2$ is injected into the single-mode optical fiber 2, light of red having the wavelength of $\lambda 3$ is injected into the single-mode optical fiber 3, and multiplexed light of these wavelengths, i.e., $\lambda 1$, $\lambda 2$, and $\lambda 3$, is emitted from the single-mode optical fiber 1.

In Example, the three-wavelength optical multiplexer 100 is such that the secondary-mode cutoff wavelength C1 of the single-mode optical fiber 1 and the single-mode optical fiber 2, and the secondary-mode cutoff wavelength C2 of the single-mode optical fiber 3, and the wavelength $\lambda 3$ of the light of red incident to the single-mode optical fiber 3 have the following relation: $C1 < C2 < \lambda 3$.

On the other hand, the three-wavelength optical multiplexer 100 of Comparative Example 1 is such that the wavelengths of light incident to the single-mode optical fibers 1, 2, and 3 and the secondary-mode cutoff wavelength have the following relation: $C1 < \lambda 1, \lambda 2, \lambda 3$. In other words, in the Comparative Example 1, the secondary-mode cutoff wavelengths of all the single-mode optical fibers 1, 2, and 3 are smaller than the wavebands $\lambda 1$, $\lambda 2$, $\lambda 3$ of incident light.

The three-wavelength optical multiplexer 100 of the Comparative Example 2 includes single-mode optical fibers 1 and 3 having the same parameters, and a single-mode optical fiber 2 having parameters different from those of the other two, as in the case of Example. However, light injected into the single-mode optical fiber 2 and light injected into the single-mode optical fiber 3 are other way around as compared with those of Example.

Figure 8:
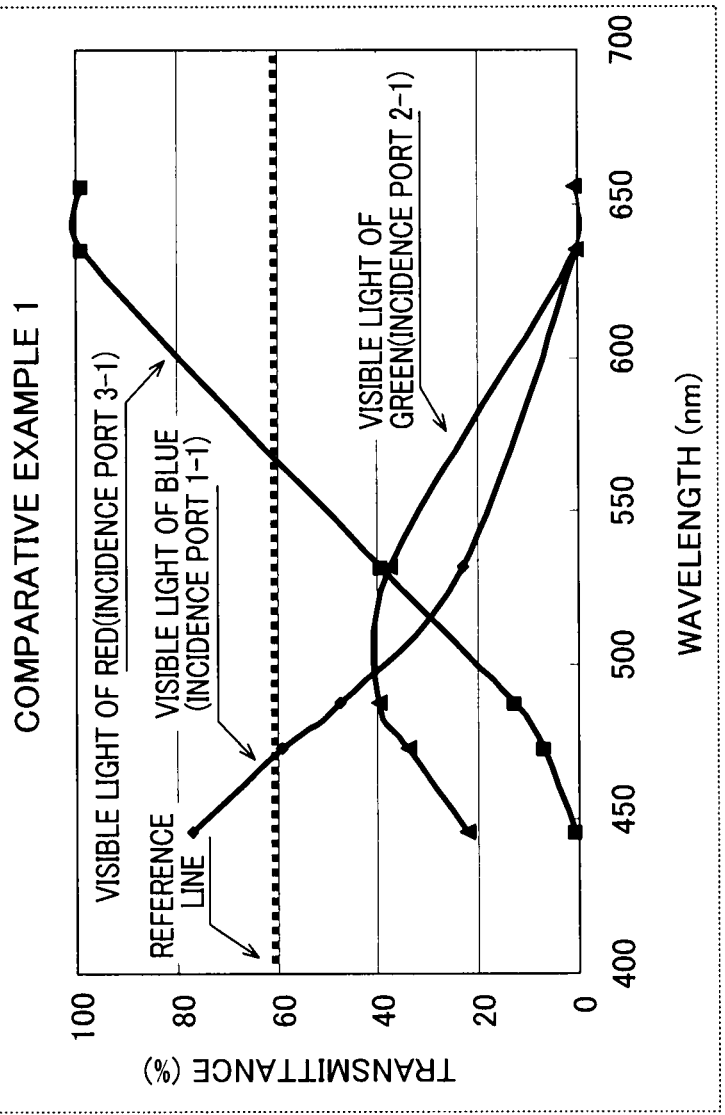
FIG. 8 shows a graph of wavelength versus transmittance of light emitted from a three-wavelength optical multiplexer of Comparative Example 1.
Figure 9:
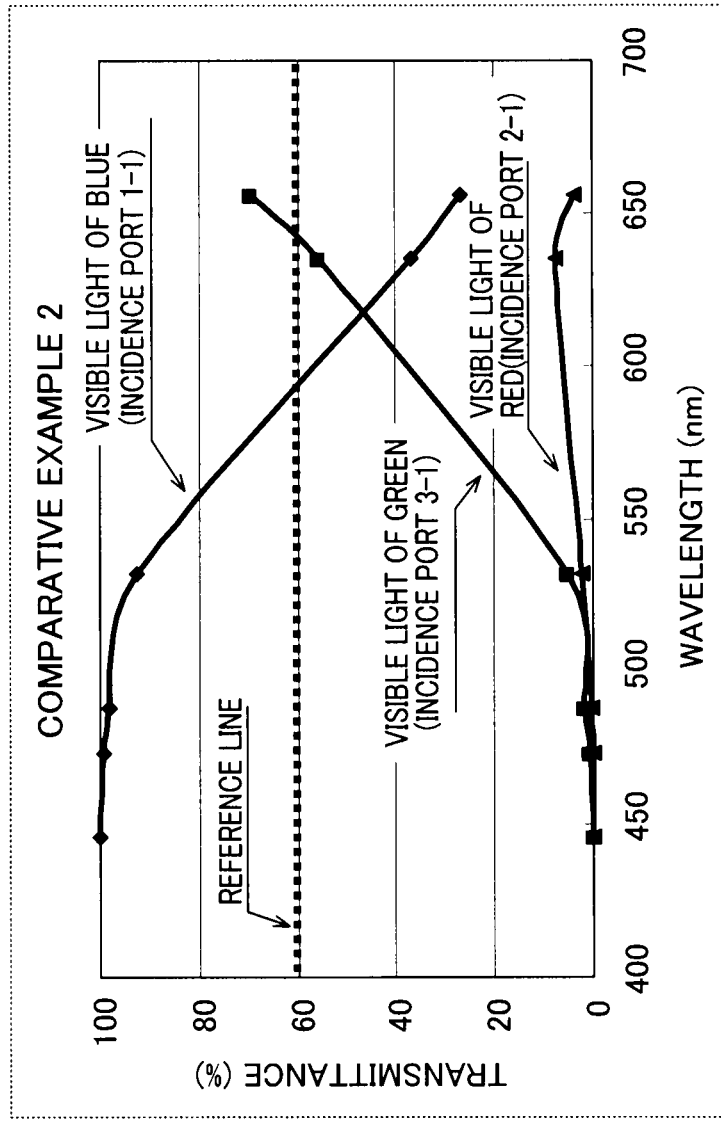
FIG. 9 shows a graph of wavelength vs. transmittance of light emitted from a three-wavelength optical multiplexer of Comparative Example 2.
Figure 10:
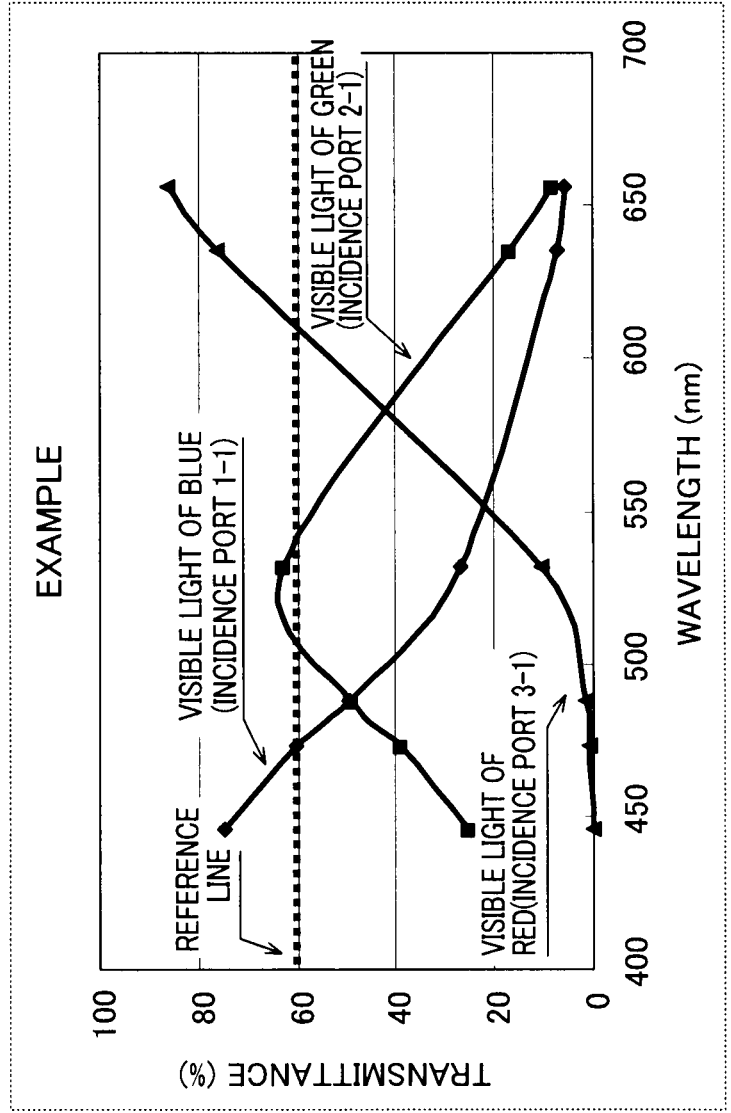
FIG. 10 shows a wavelength vs. transmittance graph of light emitted from the three-wavelength optical multiplexer of Example.

For the three-wavelength optical multiplexers 100 of the Comparative Examples 1 and 2 and Example having the above described relations, FIG. 8-FIG. 10 show graphs of wavelength vs. transmittance of light emitted from the emission port 1-2, for visible light injected into the incidence ports 1-1, 2-1, and 3-1.

Note that, to make the wavelength vs. transmittance graphs of FIG. 8-FIG. 10, a laser light source was used to inject different wavelengths of light into the three-wavelength optical multiplexer 100, and an optical power meter was used to measure the transmittance of emitted light at six points.

FIG. 8 shows the wavelength vs. transmittance graph for the Comparative Example 1. As shown in FIG. 8, when only light of blue was injected into the incidence port 1-1, the emission peak value of close to 80% was achieved in relation to the light emitted from the emission port 1-2, a blue wavelength of 446 nm. Further, when only light of red was injected into the incidence port 3-1, the emission peak value of 100% was achieved in relation to the light emitted from the emission port 1-2, at a red wavelength of 635 nm. However, when only light of green was injected into the incidence port 2-1, the emission peak value achieved in relation to the light emitted from the emission port 1-2 was only about 40%, at a green wavelength of 532 nm, which falls short by far a targeted reference transmittance of 60%.

Further, FIG. 9 shows the wavelength vs. transmittance graph for the Comparative Example 2. As shown in FIG. 9, when only light of blue was injected into the incidence port 1-1, the emission peak value of close to 100% was achieved in relation to the light emitted from the emission port 1-2, a blue wavelength of 446 nm. However, when only light of red was injected into the incidence port 2-1, the emission peak value achieved in relation to the light emitted from the emission port 1-2 was only about 10%, at a red wavelength of 635 nm. Further, when only light of green was injected into the incidence port 3-1, the emission peak value achieved in relation to the light emitted from the emission port 1-2 was only about 10%, at a point green wavelength of 532 nm, which falls short by far a targeted reference transmittance of 60%.

On the other hand, FIG. 10 shows the wavelength vs. transmittance graph for Example 1. As shown in FIG. 10, when only light of blue was injected into the incidence port 1-1, the emission peak value of close to 70% was achieved in relation to the light emitted from the emission port 1-2, a blue wavelength of 446 nm. Further, when only light of red was injected into the incidence port 3-1, the emission peak value of 80% or higher was achieved in relation to the light emitted from the emission port 1-2, at a red wavelength of 635 nm. Further, when only light of green was injected into the incidence port 2-1, the resulting emission peak value of the light emitted from the emission port 1-2 was at or higher than the targeted reference transmittance of 60% at a green wavelength of 532 nm.

The above results show that the transmittance of light of green falls short by far the targeted reference of 60%, when the single-mode optical fiber A having the same parameters are adopted for all of the single-mode optical fibers 1, 2, and 3 of the three-wavelength optical multiplexer 100, as in the case of Comparative Example 1.

Further, the transmittance of the light of green and that of light of red are significantly deteriorated when light of blue is injected into the single-mode optical fiber 1, light of red is injected into the single-mode optical fiber 2, and light of green is injected into the single-mode optical fiber 3, as in the case of Comparative Example 2.

On the other hand, the three wavelengths of light are multiplexed at a transmittance higher than a targeted reference (60%), when: the single-mode optical fiber A having the same parameters are adopted for the single-mode optical fibers 1 and 2; a single-mode optical fiber B having parameters different from the other two is adopted for the single-mode optical fiber 3; light of blue is injected into the single-mode optical fiber 1, light of green is injected into the single-mode optical fiber 2, and light of red is injected into the single-mode optical fiber 3, as in Example.

As described, to multiplex at a transmittance of a certain reference (60%) or higher different wavelengths of light, particularly light of red, green, and blue incident to three single-mode optical fibers 1, 2, and 3, the structure and arrangement of the single-mode optical fibers 1, 2, and 3 as described in Example are required.

Overview of the Present Embodiment

As described hereinabove, a three-wavelength optical multiplexer 100 of one embodiment of the present invention includes: three single-mode optical fibers including a single-mode optical fiber 1 capable of performing single-mode transmission, a single-mode optical fiber 2 capable of performing single-mode transmission, and a single-mode optical fiber 3 capable of performing single-mode transmission, which are arranged parallel to one another in this order, as observed from a cross sectional direction orthogonal to a fiber axis direction. The single-mode optical fiber 1 and the single-mode optical fiber 3 are not in contact with each other, but are in contact with the single-mode optical fiber 2. Of the three single-mode optical fibers, the single-mode optical fiber 1 has parameters which are the same as parameters of the single-mode optical fiber 2, and the single-mode optical fiber 3 has parameters which are different from the parameters of the single-mode optical fiber 1 and the parameters of the single-mode optical fiber 2. Where a relation among wavelengths of light injected into the three single-mode optical fibers 1, 2, and 3 is $\lambda 1 < \lambda 2 < \lambda 3$, light injected into the single-mode optical fiber 1 has the wavelength of $\lambda 1$, light injected into the single-mode optical fiber 2 has the wavelength of $\lambda 2$, light injected into the single-mode optical fiber 3 has the wavelength of $\lambda 3$, and multiplexed light of light having these wavelengths of $\lambda 1$, $\lambda 2$, $\lambda 3$ is emitted from the single-mode optical fiber 1.

With the above structure, the three wavelengths of light injected are multiplexed at a transmittance of a certain reference (60%) or higher. Further, since the three single-mode optical fibers 1, 2, and 3 are integrally structured, the optical multiplexer 100 is made compact.

Further, the three-wavelength optical multiplexer 100 of the one embodiment of the present invention is adapted so that single-mode optical fiber 1, the single-mode optical fiber 2, and the single-mode optical fiber 3 are arranged parallel to one another in this order, along a single plane.

In the structure, the single-mode optical fiber 1, the single-mode optical fiber 2, and the single-mode optical fiber 3 are arranged parallel to one another in this order on a single plane. This facilitates packaging and realizes a stable quality.

Further, in the one embodiment of the present invention, the single-mode optical fiber 1, the single-mode optical fiber 2, and the single-mode optical fiber 3 are single-mode optical fibers, and these three single-mode optical fibers 1, 2, and 3 are collectively fused and drawn.

In the above structure, the single-mode optical fiber 1, the single-mode optical fiber 2, and the single-mode optical fiber 3 are each a single-mode optical fiber, and these three single-mode optical fibers 1, 2, and 3 are collectively fused and drawn. This facilitates manufacturing of a light combining portion 6 with a stable quality.

Further, the three-wavelength optical multiplexer 100 of one embodiment of the present invention is adapted so that// one of the parameters is a secondary-mode cutoff wavelength, and a secondary-mode cutoff wavelength C1 of the single-mode optical fiber 1 and the single-mode optical fiber 2, a secondary-mode cutoff wavelength C2 of the single-mode optical fiber 3, and the wavelength $\lambda 3$ of light injected into the single-mode optical fiber 3 have a relation of $C1 < C2 < \lambda 3$.

With the above structure, the three wavelengths of incident light are more suitably multiplexed at a transmittance of a certain reference (60%) or higher.

Further, in the one embodiment according to the present invention, the single-mode optical fiber 2 and the single-mode optical fiber 3 respectively have emission ports 2-2 and 3-2 which are subjected to a reflectionless termination.

With the above structure, it is possible to realize a three-wavelength optical multiplexer 100 with three inputs and one output, while eliminating waveguides which are substantially unnecessary.

Further, in the one embodiment of the present invention, the light having the wavelength of $\lambda 1$, the light having the wavelength of $\lambda 2$, the light having the wavelength of $\lambda 3$ may be visible light of blue, green, and red, respectively.

The above structure enables multiplexing of visible light of blue, green, and red; i.e., light having three wavelengths.

Thus, the one embodiment of the present invention is described. Note that the present invention is not limited to the above described embodiment.

For example, in the present embodiment, light of blue, light of green, and light of red are injected into the incidence ports 1-1, 2-1, and 3-1 of the three single-mode optical fibers 1, 2, and 3, respectively. However, the present invention is not limited to this. The wavelength of light to be injected may be any given wavelength, provided that the wavelength and the secondary-mode cutoff wavelength have the relation of Example shown FIG. 6.

Further, in the present embodiment, the certain reference of emission power is the transmittance of 60%. However, the present invention is not limited to this. The certain reference may be a transmittance higher than 60%, or a transmittance lower than 60%.

Embodiment and examples of the present invention thus described hereinabove are solely to serve as specific examples of the present invention, and the present invention is not limited by these embodiment and examples. Various modifications of the specific structure and the design are possible. Further, the action and effect described in the above embodiment of the present invention are no more than examples of the preferable action and effect resulting from the present invention. The action and effects of the present invention are not limited to those described in the embodiment of the present invention.

INDUSTRIAL APPLICABILITY

The present invention is applicable to a three-wavelength optical multiplexer which multiplexes light injected into three single-mode optical fibers.

REFERENCE NUMERALS

1. Single-Mode Optical Fiber
1-1. Incidence Port
1-2. Emission Port
2. Single-Mode Optical Fiber
2-1. Incidence Port
2-2. Emission Port
3. Single-Mode Optical Fiber
3-1. Incidence Port
3-2. Emission Port
6. Light Combining Portion
10. End Portion
100. Three-Wavelength Optical Multiplexer

The invention claimed is:

1. A three-wavelength optical multiplexer, comprising:
three waveguides including a first waveguide capable of performing single-mode transmission, a second waveguide capable of performing single-mode transmission, and a third waveguide capable of performing single-mode transmission, which are arranged parallel to one another in this order, as observed from a cross sectional direction orthogonal to a fiber axis direction, wherein
the first waveguide, the second waveguide, and the third waveguide are single-mode optical fibers, and these three waveguides are collectively fused and drawn,
the first waveguide and the third waveguide are not in contact with each other, but are in contact with the second waveguide,
of the three waveguides, the first waveguide has parameters which are the same as parameters of the second waveguide, and the third waveguide have parameters which are different from the parameters of the first waveguide and the parameters of the second waveguide,
where a relation among wavelengths of light injected into the three waveguides is $\lambda 1 < \lambda 2 < \lambda 3$, light injected into the first waveguide has the wavelength of $\lambda 1$, light injected into the second waveguide has the wavelength of $\lambda 2$, light injected into the third waveguide has the wavelength of $\lambda 3$, and multiplexed light of light having these wavelengths $\lambda 1$, $\lambda 2$, and $\lambda 3$ is emitted from the first waveguide, and
one of the parameters is a secondary-mode cutoff wavelength, and a secondary-mode cutoff wavelength C1 of the first single-mode optical fiber and the second single-mode optical fiber, a secondary-mode cutoff wavelength C2 of the third single-mode optical fiber, and a wavelength $\lambda 3$ of light injected into the third single-mode optical fiber have a relation of $C1 < C2 < \lambda 3$.

2. The three-wavelength optical multiplexer according to claim 1, wherein each of the second waveguide and the third waveguide has an emission port which is subjected to a reflectionless termination.

3. A three-wavelength optical multiplexer, comprising:
three waveguides including a first waveguide capable of performing single-mode transmission, a second waveguide capable of performing single-mode transmission, and a third waveguide capable of performing single-mode transmission, which are arranged parallel to one another in this order, as observed from a cross sectional direction orthogonal to a fiber axis direction, wherein
the first waveguide, the second waveguide, and the third waveguide are single-mode optical fibers, and these three waveguides are collectively fused and drawn,
the first waveguide, the second waveguide, and the third waveguide are arranged parallel to one another in this order, along a single plane,
the first waveguide and the third waveguide are not in contact with each other, but are in contact with the second waveguide,
of the three waveguides, the first waveguide has parameters which are the same as parameters of the second waveguide, and the third waveguide have parameters which are different from the parameters of the first waveguide and the parameters of the second waveguide,
where a relation among wavelengths of light injected into the three waveguides is $\lambda 1 < \lambda 2 < \lambda 3$, light injected into the first waveguide has the wavelength of $\lambda 1$, light injected into the second waveguide has the wavelength of $\lambda 2$, light injected into the third waveguide has the wavelength of $\lambda 3$, and multiplexed light of light having these wavelengths $\lambda 1$, $\lambda 2$, and $\lambda 3$ is emitted from the first waveguide, and
one of the parameters is a secondary-mode cutoff wavelength, and a secondary-mode cutoff wavelength C1 of the first single-mode optical fiber and the second single-mode optical fiber, a secondary-mode cutoff wavelength C2 of the third single-mode optical fiber, and a wavelength $\lambda 3$ of light injected into the third single-mode optical fiber have a relation of $C1 < C2 < \lambda 3$.

4. The three-wavelength optical multiplexer according to claim 3, wherein each of the second waveguide and the third waveguide has an emission port which is subjected to a reflectionless termination.

5. The three-wavelength optical multiplexer according to any one of claims 1, 3, 2 and 4, wherein the light having the wavelength of $\lambda 1$, the light having the wavelength of $\lambda 2$, and the light having the wavelength of $\lambda 3$ are visible light of blue, green, and red, respectively.

* * * * *